United States Patent
Sato

(10) Patent No.: US 9,081,089 B2
(45) Date of Patent: Jul. 14, 2015

(54) DEVICE, METHOD AND PROGRAM FOR IDENTIFYING UNNECESSARY SIGNAL, GNSS RECEIVING APPARATUS AND MOBILE TERMINAL

(75) Inventor: Miki Sato, Nishinomiya (JP)

(73) Assignee: FURUNO ELECTRIC COMPANY LIMITED, Hyogo (JP)

( * ) Notice: Subject to any disclaimer, the term of this patent is extended or adjusted under 35 U.S.C. 154(b) by 406 days.

(21) Appl. No.: 13/512,501

(22) PCT Filed: Nov. 30, 2010

(86) PCT No.: PCT/JP2010/071330
§ 371 (c)(1),
(2), (4) Date: May 29, 2012

(87) PCT Pub. No.: WO2011/065559
PCT Pub. Date: Jun. 3, 2011

(65) Prior Publication Data
US 2012/0235862 A1    Sep. 20, 2012

(30) Foreign Application Priority Data
Nov. 30, 2009   (JP) .................................. 2009-270921

(51) Int. Cl.
*G01S 19/21* (2010.01)
*G01S 19/22* (2010.01)

(52) U.S. Cl.
CPC ...... *G01S 19/21* (2013.01); *G01S 19/22* (2013.01)

(58) Field of Classification Search
CPC ................................ G01S 19/21; G01S 19/22
USPC ........................................ 342/357.59, 357.61
See application file for complete search history.

(56) References Cited

U.S. PATENT DOCUMENTS 6,188,679 B1 *   2/2001   Sato ............................. 370/335
6,483,814 B1 *  11/2002   Hsu et al. ..................... 370/277
(Continued)

FOREIGN PATENT DOCUMENTS

JP    2001-237744 A    8/2001
JP    2003-139843 A    5/2003
(Continued)

OTHER PUBLICATIONS

International Search Report, dated Feb. 1, 2011, issued in PCT/JP2010/071330.

*Primary Examiner* — Harry Liu
(74) *Attorney, Agent, or Firm* — Global IP Counselors, LLP

(57) ABSTRACT

To achieve an unnecessary signal identifying device that can accurately identify an unnecessary signal from a reception signal. Correlators 321-32n correlation process the reception signal and a replica code at every predetermined timing, and output correlation data. Each of Buffers 331-33n stores a predetermined sampling number of the correlation data along a code phase axis, and output them to FFT processors 341-34n and a identifier 35. Each of the FFT processors 341-34n FFT processes the predetermined sampling number of the correlation data to acquire a frequency spectrum, and output it to the identifier 35. From a correlation data series on the code phase axis and the frequency spectrum, the identifier 35 acquires a property of the correlation data for a two-dimensional range of the code phase axis and a frequency axis, and identifies the signal with the property coinciding matching with characteristics of the unnecessary signal as the unnecessary signal.

17 Claims, 7 Drawing Sheets

(56) References Cited

U.S. PATENT DOCUMENTS

| | | |
|---|---|---|
| 7,127,011 B2 | 10/2006 | Rowitch |
| 7,257,153 B2 | 8/2007 | Kontola |
| 7,764,726 B2 | 7/2010 | Simic et al. |
| 8,175,136 B2 | 5/2012 | Matsumoto |
| 2008/0079633 A1* | 4/2008 | Pon et al. .................. 342/357.12 |
| 2008/0238772 A1* | 10/2008 | Soloviev et al. ......... 342/357.14 |
| 2009/0121924 A1 | 5/2009 | Muto |
| 2009/0129449 A1 | 5/2009 | Gobara |
| 2009/0196378 A1* | 8/2009 | Wei .............................. 375/340 |

FOREIGN PATENT DOCUMENTS

| | | |
|---|---|---|
| JP | 2006-38486 A | 2/2006 |
| JP | 2006038486 A | 2/2006 |
| JP | 2008-522558 A | 6/2008 |
| JP | 2008160642 A | 7/2008 |
| JP | 2009-27305 A | 2/2009 |
| JP | 2009128027 A | 6/2009 |

* cited by examiner

DEVICE, METHOD AND PROGRAM FOR IDENTIFYING UNNECESSARY SIGNAL, GNSS RECEIVING APPARATUS AND MOBILE TERMINAL

TECHNICAL FIELD

The present invention relates to an unnecessary signal identifying device for identifying an unnecessary signal contained in reception signals, and relates to a GNSS receiving apparatus including the unnecessary signal identifying device and for acquiring a desired positioning signal contained in the reception signals.

BACKGROUND ART

Conventionally, GNSS systems, such as GPS and Galileo, are used in, for example, positioning by receiving positioning signals from a plurality of GNSS satellites and demodulating the positioning signals.

With such a GNSS receiving apparatus, it is required to select only the positioning signals serving as target signals, from reception signals, and acquire and track the positioning signals. For example, according to Patent Document 1, a threshold is set for a CN of a reception signal, and positioning signals to be used in acquiring and tracking are selectively acquired.

Further, as a method of detecting the unnecessary signal other than the positioning signals serving as the target signals, according to Patent Document 2, an unnecessary signal is determined to exist when over a predetermined number of spectral peaks of the reception signal are detected.

REFERENCE DOCUMENT(S) OF CONVENTIONAL ART

Patent Documents

Patent Document 1: JP2003-139843A
Patent Document 2: U.S. Pat. No. 7,127,011

DISCLOSURE OF THE INVENTION

Problem(s) to be Solved by the Invention

However, with the method in Patent Document 1, the positioning signal is distinguished simply based on the CN of the reception signal, and the signal is adopted as the positioning signal if it exceeds the threshold of the CN. Therefore, there is a possibility that an unnecessary signal due to, for example, an interfering wave, a multipath, or a cross correlation caused by a communication signal from a system other than the target system may be acquired as the positioning signal mistakenly.

Particularly in recent years, receiving sensitivities of GNSS receiving apparatuses have improved, and each of the unnecessary signals described above has been easily received at high level in addition to the target positioning signals. Therefore, the unnecessary signal is highly possible to be acquired as the positioning signal mistakenly.

Meanwhile, with the method in Patent Document 2, although it can be identified that the unnecessary signal exists, the above described kinds of the unnecessary signals cannot be identified.

The object of the present invention is to achieve an unnecessary signal identifying device that can identified an unnecessary signal from reception signals accurately, and moreover, to achieve a GNSS receiving apparatus including such an unnecessary signal identifying device so as to be able to acquire and track a target positioning signal accurately.

SUMMARY OF THE INVENTION

The present invention relates to an unnecessary signal identifying device for identifying an unnecessary signal from reception signals containing a target signal that is code transformed with a predetermined spread code. The unnecessary signal identifying device includes a correlation data series acquirer and an identifier. The correlation data series acquirer acquires a correlation data series on a code phase axis and a correlation data series on a frequency axis from correlation data between a replica code for the spread code, and the reception signal. The identifier identifies the unnecessary signal based on the correlation data series on the code phase axis and the correlation data series on the frequency axis.

Further specifically, the correlation data series acquirer may store the correlation data for a predetermined time period and transform the stored correlation data to data for a frequency range so as to acquire the correlation data series on the code phase axis and the correlation data series on the frequency axis.

Further, the present invention relates to a method and program of identifying an unnecessary signal from reception signals containing a target signal that is code transformed with a predetermined spread code. The method and program include acquiring a correlation data series on a code phase axis and a correlation data series on a frequency axis from correlation data between a replica code for the spread code and the reception signal. The method and program include identifying the unnecessary signal based on the correlation data series on the code phase axis and the correlation data series on the frequency axis.

With these configuration, method, and program, when the correlation data series is observed two-dimensionally along two axes, the code phase and the frequency axes, as shown in FIG. 4 described later, the correlation data series is different between the target signal (see FIG. 4(A)) and the unnecessary signal (see FIGS. 4(B) to 4(D)). Further, by obtaining the properties of the correlation data of the reception signal on the two axes, that is the correlation data series on the code phase axis and the correlation data series on the frequency axis, the unnecessary signal is identified.

Further, the identifier of the unnecessary signal identifying device may store in advance a correlation data series on the code phase axis and a correlation data series on the frequency axis which are formed with correlation data of which the target signal is correlation processed with the replica code, as a reference property. Further, the identifier may identify the unnecessary signal by comparing the reference property with an actual property based on the correlation data series on the code phase axis and the correlation data series on the frequency axis which are formed with the correlation data of which the reception signal is correlation processed with the replica code.

Further specifically, the identifier of the unnecessary signal identifying device may identify the unnecessary signal by correcting the correlation data of the reference property or the actual property so as to coincide peak levels of the correlation data between the reference property and the actual property, and calculating similarities therebetween on the code phase axis and the frequency axis by using the corrected property. Here, for example, the similarity is obtained based on difference values between the properties after the correction.

With this configuration, a result of observing the correlation data of the target signal along two axes, the code phase and the frequency axis is acquired in advance as a reference property. Further, an actual measurement property obtained from the correlation data of the reception signal is compared with reference property, and if the similarity is not above a predetermined level, the reception signal is identified as the unnecessary signal. By comparing such an actual measurement property and the reference property, the unnecessary signal can accurately be identified. Further, by the identification based on such a similarity, an influence due to a change of a C/N of the reception signal can be suppressed and the unnecessary signal can accurately be identified. Especially, if the similarity is calculated and the identification is performed after the peak levels of the reference property and the actual property the similarity are coincided to each other, the level of the reception signal itself and an influence by a set level of the reference property can be suppressed, and further the unnecessary signal can accurately be identified.

Further, the identifier of the unnecessary signal identifying device may determine a kind of the unnecessary signal as any one of a multipath signal, a cross correlation signal, and an interfering wave signal, by using both the similarity on the frequency axis and the similarity on the code phase axis.

This configuration indicates further specifically the above kinds of the unnecessary signal to be identified. This uses that the multipath signal, the cross correlation signal, and the interfering wave signal have individual properties on the frequency axis and the code phase axis, respectively, and the similarities thereamong are different.

Further, the identifier of the unnecessary signal identifying device may identify the unnecessary signal as any one of an interfering wave signal, a multipath signal, and a cross correlation signal based on the number of the correlation data at peak levels on the code phase axis, the number of the correlation data at peak levels on the frequency axis, and a positional relation between the peaks.

This configuration indicates the method of identifying the unnecessary signal when the above similarities are not used. As described above, on the frequency axis and the code phase axis, the multipath signal, the cross correlation signal, and the interfering wave signal that are the unnecessary signals are have the properties of the correlation data series different from the target signal. Specifically, the number of peaks and the positional relation between the peaks are different. Further, the properties of the correlation data series are different among the multipath signal, the cross correlation signal, and the interfering wave signal. Therefore, even by utilizing such a difference between the properties of the correlation data series, the identification of the unnecessary signal and the kind of the unnecessary signal can be performed.

Further, the present invention relates to a GNSS receiving apparatus for using positioning signals transmitted from GNSS satellites as the target signals and receiving the positioning signals. A demodulating unit of the GNSS receiving apparatus includes the unnecessary signal identifying device described above, tracks the target signals identified by the unnecessary signal identifying device and demodulates the target signals.

This configuration indicates the GNSS receiving apparatus including the above unnecessary signal identifying device. Further, this GNSS receiving apparatus can demodulate only the reception signal determined as the target signal by having the above unnecessary signal identifying device.

Further, the demodulating unit of the GNSS receiving apparatus may continue the identifying processing of the target signals and the unnecessary signal until the target signals are acquired and tracked.

With this configuration, loop processing is performed while executing the above unnecessary signal identifying processing so as to acquire the target signal. Thereby, the required number of the target signals can further surely be acquired and tracked without acquiring and tracking the unnecessary signal.

Further, the present invention relates to a mobile terminal including the GNSS receiving apparatus described above. The mobile terminal includes a positioning calculator for positioning a position of the apparatus itself by using the target signals acquired by the GNSS receiving apparatus.

With this configuration, because the positioning is performed based on the target signals acquired by the GNSS receiving apparatus including the above unnecessary signal identifying device, a highly accurate positioning can be performed.

EFFECT OF THE INVENTION

According to the invention, an interfering wave signal, a multipath signal, or a cross correlation signal in the reception signals can be identified from the target signals accurately. Thereby, only the positioning signals serving as the target signals contained in the reception signals can be acquired and tracked further accurately.

MODE OF CARRYING OUT THE INVENTION

A configuration of an unnecessary signal identifying device according to a first embodiment is explained with reference to the drawings. In this embodiment, an unnecessary signal identifying device provided to a GNSS receiving apparatus used in a GNSS system is explained.

Further, in this embodiment, although simply the GNSS receiving apparatus is explained as an example, the following acquiring method and configuration can be applied to various kinds of mobile terminals implemented with an application that uses a positioning result calculated by the GNSS receiving apparatus (e.g., a mobile phone, a car navigation system, a PND, a camera, a watch).

Figure 1:
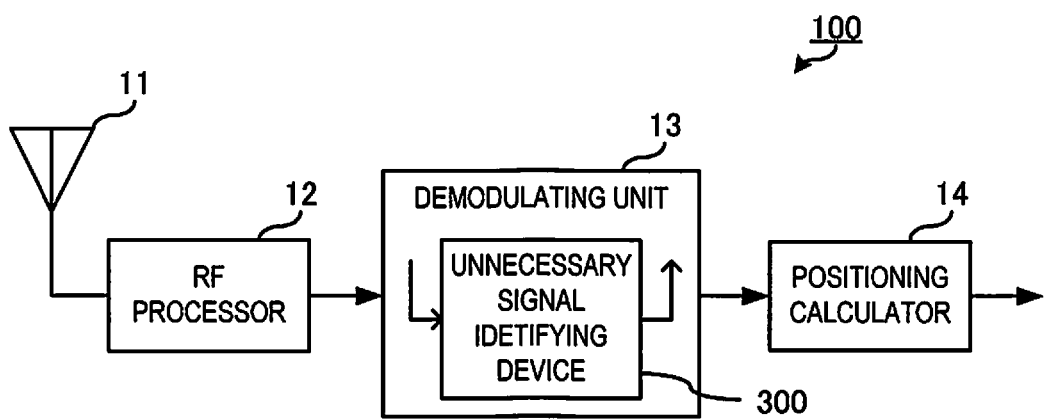
FIG. 1 is a block diagram showing a main configuration of a GNSS receiving apparatus 100 including a demodulating unit 13 having an unnecessary signal identifying device 300 according to a first embodiment.

FIG. 1 is a block diagram showing a main configuration of a GNSS receiving apparatus 100 including a demodulating unit 13 having an unnecessary signal identifying device 300 of this embodiment. The GNSS receiving apparatus 100 includes a positioning signal reception antenna 11, an RF processor 12, the demodulating unit 13, and a positioning calculator 14.

The positioning signal reception antenna 11 receives radio signals for positioning that are sent from positioning satellites, such as GPS satellites or Galileo satellites. The radio signal for positioning (hereinafter, referred to as "the positioning signal") is a carrier wave formed with a predetermined single frequency and which is spectrally spread by a spread code set for every positioning satellite, and a navigation message. According to a receiving condition, not only the positioning signals are always contained in the reception signals but any of various kinds of unnecessary signals may be contained in the reception signals along with the positioning signals, or only the unnecessary signals may be contained in the reception signals and a significant signal may not be contained therein.

The positioning signal reception antenna 11 converts the reception signals into electrical signals and outputs them to the RF processor 12.

The RF processor 12 down-converts the frequencies of the reception signals, generates to-be-correlation-processed signals constituted with a middle frequency signal with a predetermined frequency and a baseband signal, and outputs them to the demodulating unit 13.

Figure 2:
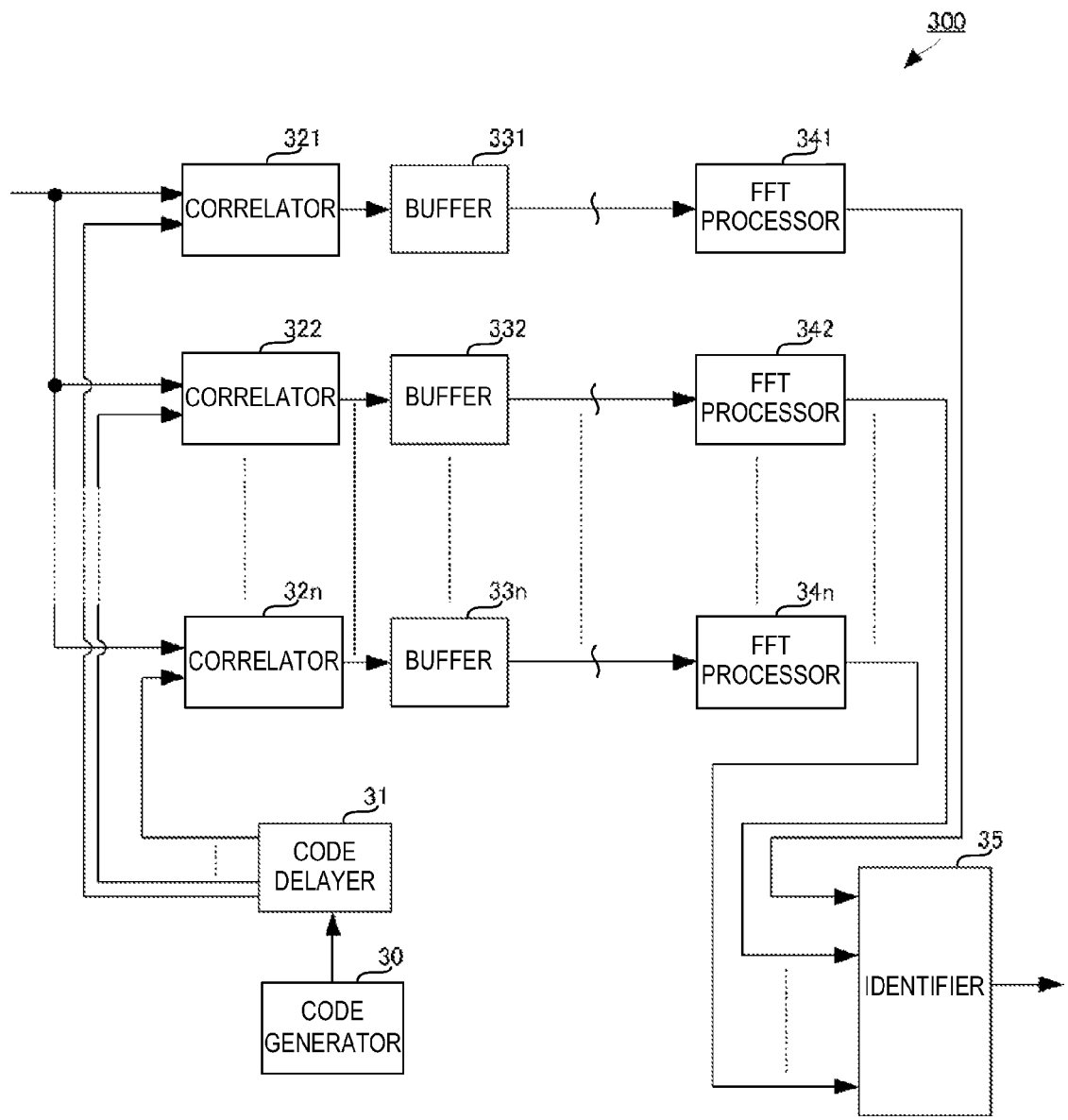
FIG. 2 is a block diagram showing a main configuration of the unnecessary signal identifying device 300 according to the first embodiment.

Although specific configuration and processing are described later, the demodulating unit 13 includes the unnecessary signal identifying device 300 as shown in FIG. 2. Based on a correlation data series of which correlation data obtained through code correlation processing is stored sequentially for a predetermined time period, the unnecessary signal identifying device 300 calculates a frequency spectrum and a code phase spectrum of the correlation data series. The unnecessary signal identifying device 300 identifies an unnecessary signal contained in the to-be-correlation-processed signals originated from the reception signals, based on the spectrums. Further, based on the identification result, the demodulating unit 13 acquires and tracks, as the positioning signal (target signal), the reception signal formed with a significant level that is not identified as the unnecessary signal, and the demodulating unit 13 de-spreads the reception signal. Here, if a tracking accuracy is sufficiently obtained, a code is locked, and a highly accurate code correlation result is obtained, the de-spread signal becomes a state where only a navigation message is superimposed thereto. Note that, known processing can be used for fundamental acquiring processing of a code phase and fundamental tracking loop processing of the code phase and a carrier phase; therefore, the explanation thereof is omitted.

After the demodulating unit 13 succeeds in the constant tracking, it supplies data that is performed with de-spreading processing by using the obtained code phase and the carrier frequency information, and, for example, a pseudorange calculated based on the code phase and the carrier frequency information, to the positioning calculator 14. Here, the demodulating unit 13 continuously performs the acquiring and tracking including the identification processing of such an unnecessary signal, so that it can constantly track the number of positioning signals required for the positioning at all times.

The positioning calculator 14 acquires the navigation message based on the de-spread signal superimposed with the navigation message, which is supplied from the demodulating unit 13. The positioning calculator 14 performs positioning calculation based on the navigation message and, for example, the pseudorange and the carrier frequency information from the demodulating unit 13, and calculates a position of a positioning device.

Thus, because the GNSS receiving apparatus 100 of this embodiment performs the acquiring and tracking by using the reception signal with the significant level that is not identified as the unnecessary signal, it can perform an accurate demodulation. Further, based on the accurate demodulation result, a highly accurate positioning result can be obtained. Moreover, because a required number of significant positioning signals can be obtained at all times while removing the unnecessary signal, a highly accurate positioning result can be obtained constantly.

Figure 3:
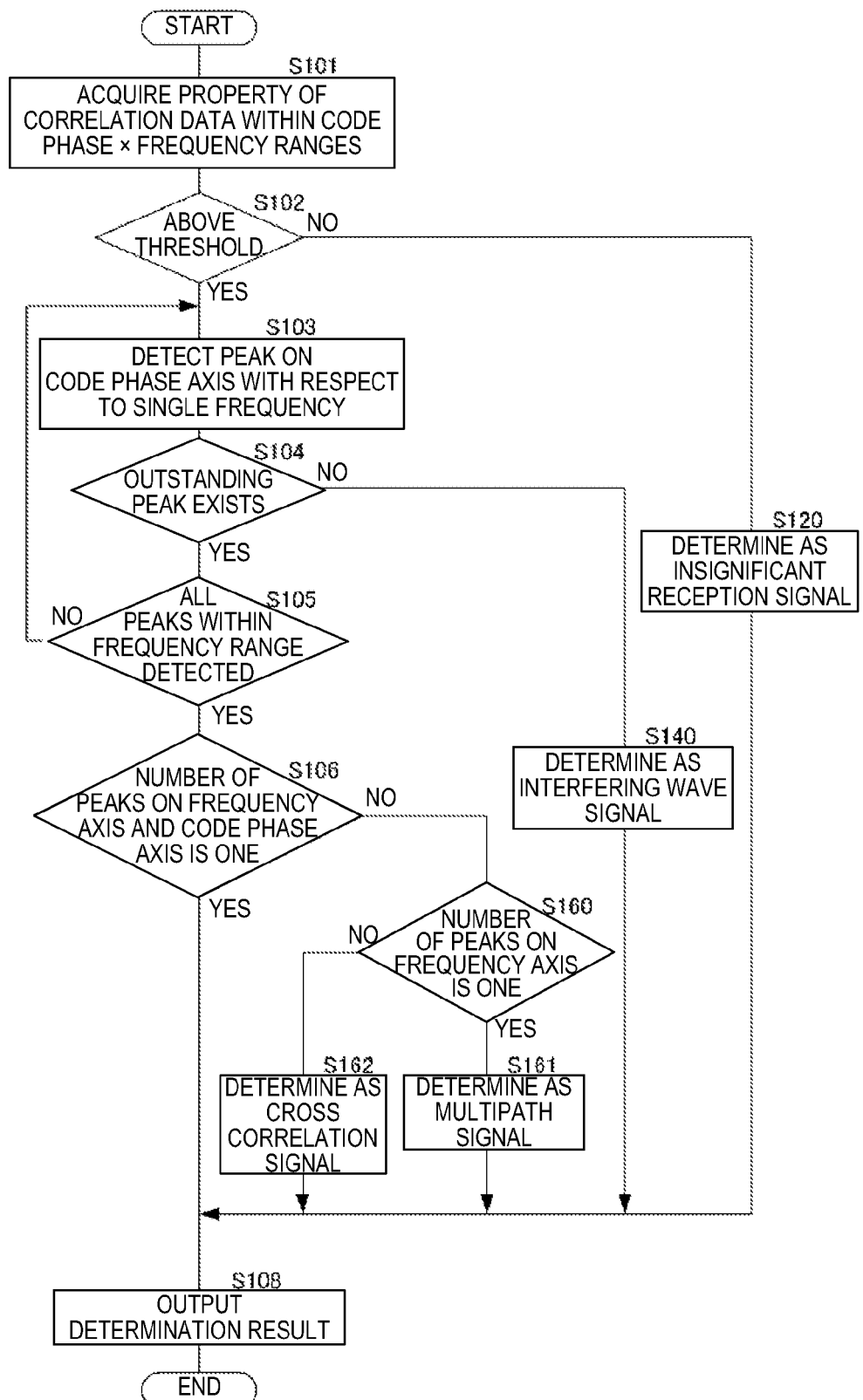
FIG. 3 is a flowchart showing an unnecessary signal identification processing flow according to the first embodiment.
Figure 4:
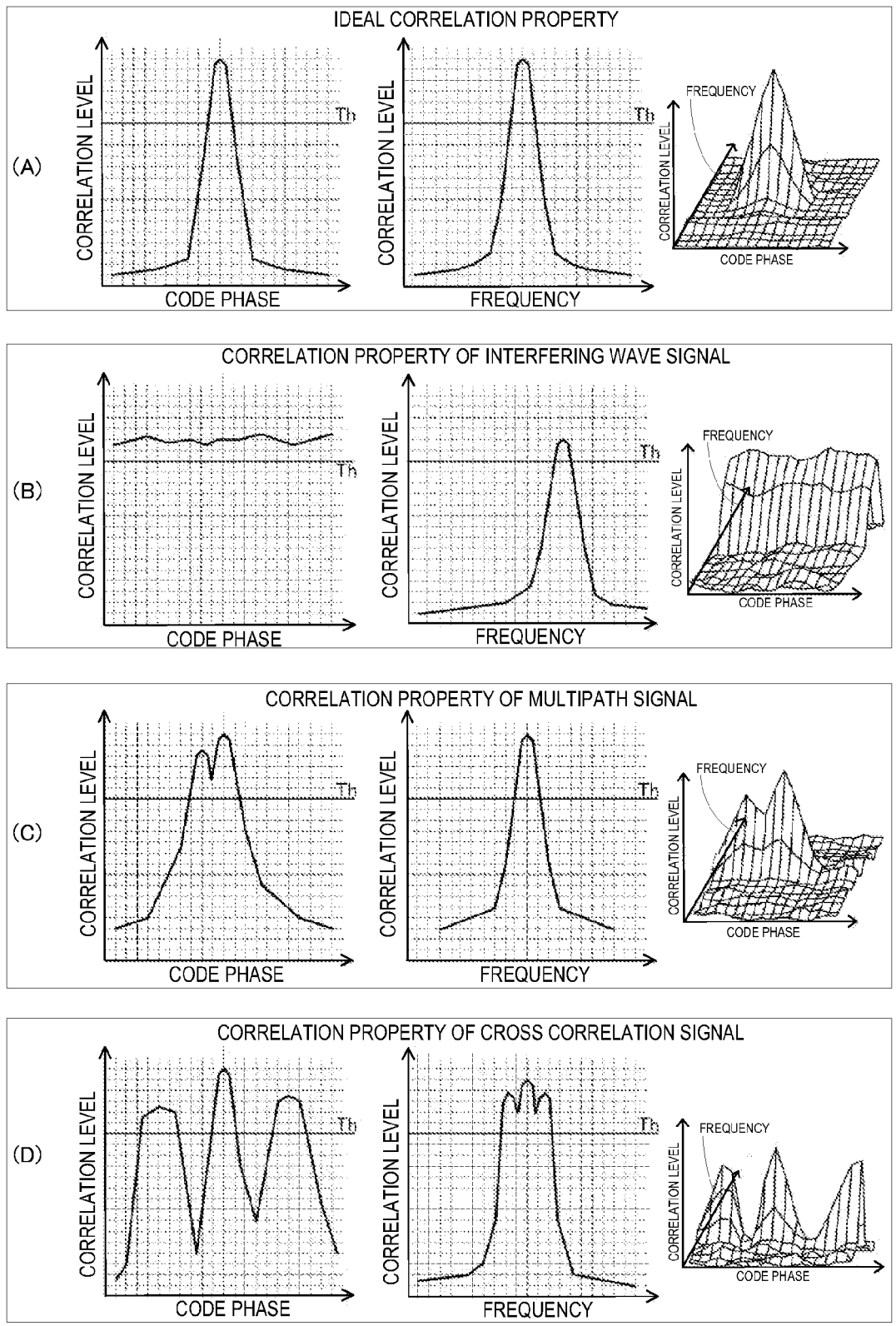
FIGS. 4(A) to 4(D) are charts showing property examples expressing properties on a code phase axis and characteristics on a frequency axis of correlation data based on a target signal and correlation data based on an unnecessary signal.

Next, specific configuration and processing of the unnecessary signal identifying device 300 are explained with reference to FIGS. 2 to 4. FIG. 2 is a block diagram showing a main configuration of the unnecessary signal identifying device 300.

The unnecessary signal identifying device 300 includes a code generator 30, a code delayer 31, correlators 321-32$n$, buffers 331-33$n$, FFT processors 341-34$n$, and a identifier 35. Here, "n" indicates the number of spontaneously processable channels corresponding to the number of trackable positioning satellites, and is a predetermined positive number. Further, the code generator 30, the code delayer 31, and the correlators 321-32$n$ are used in code acquiring processing and the code tracking processing. Further, the correlators 321-32$n$, the buffers 331-33$n$, and the FFT processors 341-34$n$ correspond to the "correlation data series acquirer" of this invention.

During the acquiring, the code generator 30 generates replica codes for spread codes assigned for the positioning satellites at specified timings, respectively, and outputs them to the code delayer 31. During the tracking, the code generator 30 generates each of the replica codes based on the code phase information set by a non-illustrated code NCO based on the tracking result of code tracking loop (not illustrated), and outputs it to the code delayer 31.

The code delayer 31 supplies the replica code for every channel to each of the correlators 321-32$n$ at every predetermined sampling timing while shifting it by a predetermined code phase amount.

The correlators 321-32$n$ generate the correlation data by multiplication processing the to-be-correlation processed signal based on the reception signal with the replica code, and output them to the buffers 331-33$n$, respectively. For example, the correlator 321 generates first correlation data by multiplication processing the to-be-correlation processed signal with a first replica code, and outputs it to the buffer 331. Similarly, the correlator 322 multiplies the to-be-correlation processed signal by a second replica code to generate second correlation data, and outputs it to the buffer 332. Each of the correlators 323-32$n$ also executes the similar correlation processing.

The buffers 331-33$n$ store the inputted correlation data sequentially along a time axis and output $2^m$ ("$m$" indicates a predetermined positive number) of them to the FFT processors 341-34$n$ at every predetermined timing, respectively. For example, the buffer 331 sequentially stores the first correlation data and outputs $2^m$ of them to the FFT processor 341 at a time. Each of the buffers 332-33$n$ also executes the similar correlation processing. Further, the buffers 331-33$n$ output the correlation data series also to the identifier 35 as well as the FFT processors 341-34$n$.

The FFT processors 341-34$n$ perform FFT (Fast Fourier Transform) processing by using the series of correlation data aligned along the time axis, which are inputted from the buffers 331-33n respectively, and acquire the frequency spectrums and the code phase spectrums of the correlation data, respectively. The FFT processors 341-34n output the acquired frequency spectrums and code phase spectrums to the identifier 35. For example, the FFT processor 341 FFT processes a first correlation data series to acquire a first frequency spectrum and code phase spectrum, and outputs them to the identifier 35. Each of the FFT processors 342-34n also executes the similar correlation processing. Note that, in this embodiment, the example of performing the FFT processing using the $2^m$ of correlation data is described; however, for example, simply any of DFT (Discrete Fourier Transform) processing and wavelet transform processing may be used to acquire the frequency spectrum.

The identifier 35 identifies the unnecessary signal based on the frequency spectrums and the code phase spectrums of the correlation data from the FFT processors 341-34n. FIG. 3 is a flowchart showing an unnecessary signal identification processing flow. FIGS. 4(A) to 4(D) are charts showing property examples expressing properties on a code phase axis and characteristics on a frequency axis of the correlation data series based on the target signal and the correlation data based on the unnecessary signal. FIG. 4(A) shows the correlation data of the target signal, FIG. 4(B) shows the correlation data of the unnecessary signal being an interfering wave signal, FIG. 4(C) shows the correlation data of the unnecessary signal being a multipath signal, and FIG. 4(D) shows the correlation data of the unnecessary signal being a cross correlation signal. Here, each of FIGS. 4(A) to (D) shows properties of the correlation data series on a single axis of either one of the code phase and frequency axes, and properties of the correlation data over two axes orthogonal to the code phase and frequency axes. Note that, the properties of the correlation data series on the code phase axis shown in FIGS. 4(A) to (D) indicate a certain single frequency, and the properties of the correlation data series on the frequency axis indicate a certain single code phase.

Note that, hereinafter, although the processing on a single channel (e.g., the system through the correlator 321, the buffer 331, the FFT processor 341) is explained to simplify the explanation, the following unnecessary signal identification processing is executed for all the channels.

The identifier 35 acquires the correlation data series on the code phase and frequency axes, that is, the code phase spectrum and the frequency spectrum of the correlation data (S101).

The identifier 35 determines whether the correlation data series within the two-dimensional range, which is obtained from the code phase and frequency axes, exceeds a threshold Th (S101→S102). Here, if the correlation data above the threshold Th does not exist (S102: NO), the identifier 35 does not determine as a significant reception signal during the period of the corresponding correlation data series (S120). This is because, if the corresponding signal is the positioning signal that can be executed the acquiring and tracking processing, as shown in FIG. 4(A), the correlation data is required to exceed the threshold Th set for the two-dimensional range. Conversely, if the signal includes the correlation data exceeding the threshold Th and is not determined as the unnecessary signal described below, the acquiring and tracking processing can surely be executed thereon.

If the correlation data above the threshold Th exists (S102: YES), the determiner 35 detects an outstanding peak on the frequency axis in each code phase where the correlation data is above the threshold Th. Further, at the frequency where the peak exists, the identifier 35 detects whether an outstanding peak exists at a point where a correlation level is high on the code phase axis (S103). Note that, the outstanding peak indicates that the correlation data has a maximum value with over a predetermined level difference from adjacent phase ranges on the code phase axis, and the identifier 35 can obtain the outstanding peak by performing, for example, differential processing on the property on the code phase axis to detect the maximum value.

If the outstanding peak above the threshold Th (maximum) is not detected (S104: NO), the identifier 35 determines that the correlation data at the corresponding frequency is the interfering wave signal (S140). This is based on properties of the interfering wave signal. In the case of being the interfering wave signal, for example, a communication signal from another communication system can be considered. As shown in FIG. 4(B), a peak on the frequency axis appears at a frequency position of the communication signal, on the other hand, on the code phase axis, a level of the correlation data with the spread code of the target positional signal constantly rises, and the outstanding peak does not appear.

Next, if the outstanding peak is detected on the code phase axis (S104: YES), the identifier 35 performs the determination of the interfering wave signal similarly at one or more frequencies where the correlation data having the level above the threshold Th is detected (S105: NO→S103).

After performing the determination of the interfering wave signal for all the frequencies where the correlation data having the level above the threshold Th is detected (S105: YES), the identifier 35 determines whether the number of peaks at all the frequencies and all the code phase within the determination range is one.

If the number of peaks is one, the identifier 35 determines that the peak is caused from a significant positioning signal (S106: YES).

On the other hand, if the number of peaks is determined as a plural number, the identifier 35 shifts the processing to a flow where a kind of the unnecessary signal is determined based on a positional relation between the peaks on the code phase and frequency axes and the number of peaks (S106: NO).

If the number of peaks on the code phase axis is two and they are close to each other, and if the number of peaks on the frequency axis is one (S160: YES), the identifier 35 determines as the multipath signal (S161). This is based on properties of the multipath signal. The multipath signal is caused when a positioning signal from a single positioning satellite is not always directly received but it reflects on, for example, a construction and the reception thereof is delayed. Therefore, as shown in FIG. 4(C), on the single frequency axis, the multipath signal causes two level peaks of the correlation data at close positions on the code phase axis and not in the same code phase.

Whereas, if the number of peaks on the code phase axis is three and they exist independently with some extent of code phase difference therebetween, and if the number of peaks on the frequency axis is also three (S160: NO), the identifier 35 determines as the cross correlation signal (S162). This is based on properties of the cross correlation signal. The cross correlation signal is caused by receiving a positioning signal from a satellite that is not a target positioning satellite. In other words, because the positioning signals are received from the plurality of positioning satellites, the plurality of codes are received; therefore, the peaks on the code phase axis appear independently. Further, because the positioning satellites are at different positions with respect to the GNSS signal receiving apparatus 100 and move at different relative speeds, a doppler frequency is different for every positioning satellite. Thereby, the plurality of peaks appear also on the frequency axis.

After identifying the insignificant reception signal, the unnecessary signal, and the significant positioning signal, and further determining the unnecessary signal as any one of the interfering wave signal, the multipath signal, and the cross correlation signal, the identifier 35 outputs the determination result to the demodulating unit 13 (S108). The demodulating unit 13 executes the acquiring and tracking processing of the reception signal according to the determination result.

As above, with the configuration and performing the processing of this embodiment, the unnecessary signal can be identified from the significant positioning signals. Here, the identification does not simply depend only on the C/N of the reception signal; therefore, even if the level of the unnecessary signal is high, the identification can surely be performed.

Moreover, with the configuration and performing the processing of this embodiment, not simply a category of the unnecessary signal, but also whether the unnecessary signal is the interfering wave signal, the multipath signal, or the cross correlation signal can accurately be identified.

Next, an unnecessary signal identifying device according to a second embodiment is explained with reference to the drawings.

The unnecessary signal identifying device of this embodiment is only different in identification processing performed by the identifier 35 from the first embodiment and other configurations are the same as the first embodiment; therefore, only required parts are explained.

Figure 5:
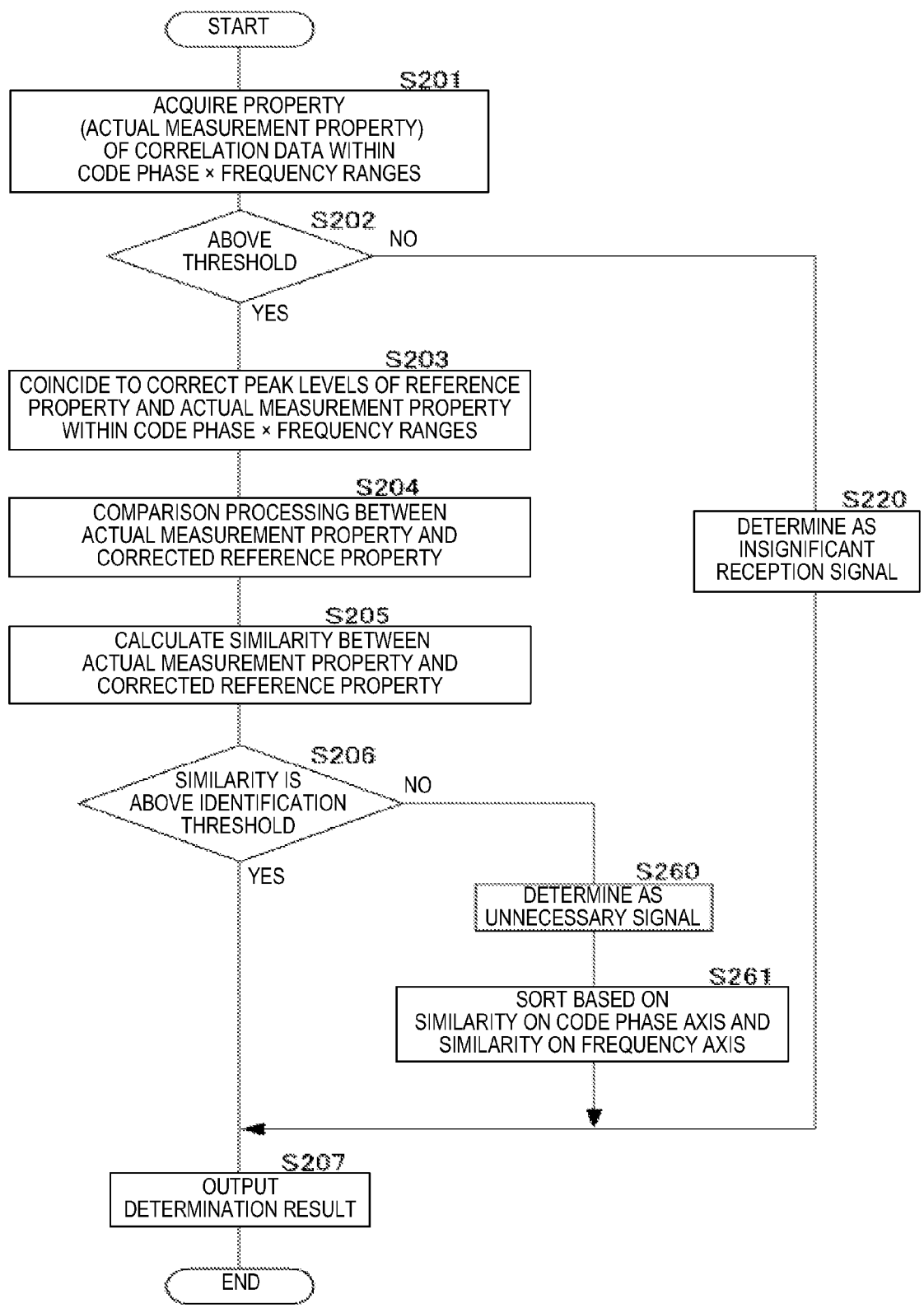
FIG. 5 is a flowchart showing an unnecessary signal identification processing flow according to a second embodiment.

FIG. 5 is a flowchart showing an unnecessary signal identification processing flow of this embodiment.

FIGS. 6(A) and 6(B) are charts illustrating processing of comparing a reference property with an actual property, in which FIG. 6(A) shows relations on code phase and frequency axes between the reference property before a reference property correction and the actual property, and FIG. 6(B) shows relations on code phase and frequency axes between the reference property after the reference property correction (corrected reference property) and the actual property.

The unnecessary signal identifying device of this embodiment stores in advance, a correlation data series within a two-dimensional range of code phase axis and frequency axis, as the reference property. The correlation data series corresponds to a target positioning signal correlation processed with a replica code.

Note that, a positioning satellite of which a reception signal serves as the positioning signal is not known; therefore, the reference property is set and stored for every positioning satellite, and the following processing is executed for every reference property corresponding to each positioning satellite.

The identifier 35 acquires a correlation data series on the code phase axis and a correlation data series on the frequency axis (actual measurement property), which are obtained through correlation processing for the reception signal and the replica code (S201). The identifier 35 determines whether a peak level exceeds a threshold Th in the correlation data series (actual measurement property) within a two-dimensional range of the code phase axis and the frequency axis, which is obtained from the reception signal (S201→S202). Here, if the correlation data above the threshold Th does not exist (S202: NO), the identifier 35 determines as an insignificant reception signal during a period of the correlation data series, and not as a significant reception signal (S220).

Next, if the peak level of the actual measurement property is determined to be above the threshold Th (S202: YES), the identifier 35 compares the correlation data series serving as the actual measurement property acquired from the reception signal with the correlation data series serving as the reference property based on the positioning signal stored in advance.

Here, the identifier 35 firstly performs a level coincidence correction between the actual measurement property and the reference property. Specifically, the identifier 35 acquires a peak level of the reference property and the peak level of the actual measurement property on the code phase axis and, as shown in FIG. 6(B), each level of the correlation data of the reference property is corrected so that the peak levels are coincided (S203). Note that, in this explanation, the case where the level correction is performed on the reference property is shown; however, even the case of correcting the actual measurement property is also supported therein.

Next, the identifier 35 compares each two-dimensional correlation data of the actual measurement property and the two-dimensional correlation data of the reference property after the level correction (hereinafter, referred to as "the corrected reference property") and calculates a similarity therebetween (S204→S205).

As the comparing method, for example, mutual correlation processing between the actual measurement property and the corrected reference property, or alternatively, a comparison value based on a differential value or a ratio between the correlation data of the actual measurement property and the corrected reference property on the frequency axis at each code phase may be used.

Further, as the calculating method of the similarity, for example, when using the difference value, the similarity is calculated based on an average value or a variance (standard deviation) of the difference values between the correlation data. Here, the similarity is set to be higher as the average value of the difference values approaches "0" and the variance and standard deviation increase.

If the similarity is above a identifying threshold stored in advance, the identifier 35 determines that the reception signal serving as the identification target is the positioning signal (S206: YES). On the other hand, if the similarity in the two dimensions is below the threshold, the identifier 35 determines the reception signal as the unnecessary signal (S206: NO→S260).

If the reception signal is determined as the unnecessary signal, the identifier 35 calculates a single-dimensional similarity per frequency axis and per code phase axis. Note that, the similarity per axis may be calculated simultaneously when calculating the two-dimensional similarity described above. The identifier 35 detects the kind of the unnecessary signal based on the similarities on the frequency and code phase axes (S261).

For example, the interfering wave signal is indicated by the property in FIG. 4(B). The property of the interfering wave differs completely from the property in FIG. 4(A) indicating the measurement signal on the code phase axis and does not have any similarity therewith. Further, the frequencies of the peaks are also different therebetween on the frequency axis; therefore, there is hardly any similarity therebetween. Thus, when the similarities on the frequency and code phase axes are low and especially when the similarity on the code phase axis is drastically low, the unnecessary signal may be identified as the interfering wave signal.

Figure 6:
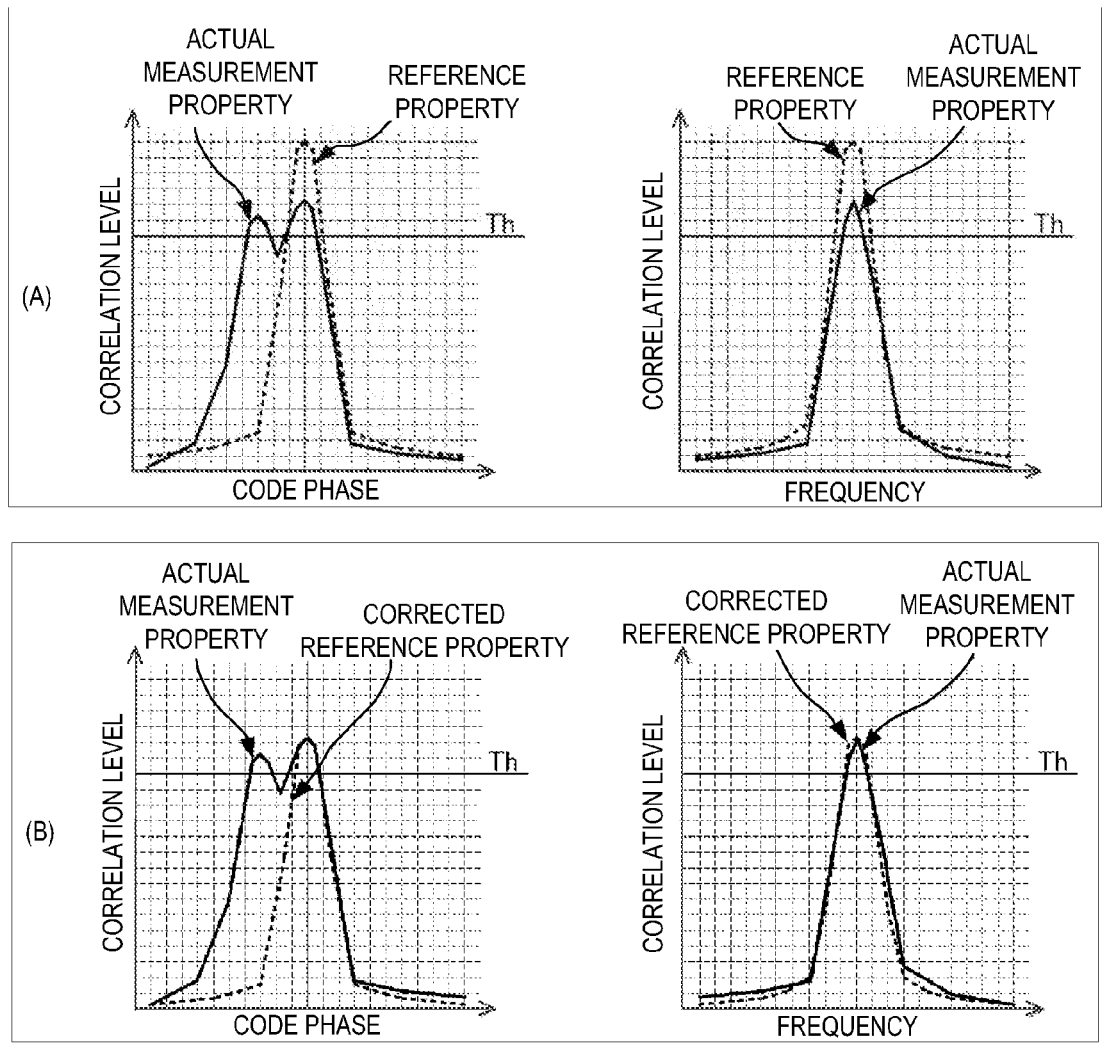
FIGS. 6(A) and 6(B) are charts illustrating processing of comparing a reference property with an actual measurement property according to the second embodiment.

Further, the multipath signal is indicated by the properties in FIG. 4(C) and the solid line in FIG. 6. The property of the multipath signal is similar on the frequency axis to the property in FIG. 4(A) indicating the positional signal and the similarity on the frequency axis is substantially the same as that of the positioning signal. On the other hand, on the code phase axis, because the multipath signal has two close peaks, it has a different property from the positioning signal, and the similarity is slightly lower on the code phase axis than the case of the positioning signal. Therefore, when the similarity on the frequency axis is above the threshold and as equivalently high as the case of the positioning signal, and when the similarity on the code phase axis is low within a predetermined range, that is, when the similarity is lower than in the case of the positioning signal but a decreased amount of level of the similarity is small, the unnecessary signal may be identified as the multipath signal.

Further, the cross correlation signal is indicated by the property in FIG. 4(D). The property of the cross correlation signal has a lower similarity on both the frequency and code phase axes than the property in FIG. 4(A) indicating the positioning signal. Specifically, because the cross correlation signal has three close peaks on the frequency axis, the similarity on the frequency axis is slightly lower than the case of the positioning signal. On the other hand, on the code phase axis, because the cross correlation signal has three peaks at independent positions spaced from each other on the code phase axis, the similarity is lower than the case of the multipath signal. Therefore, when the similarity on the frequency axis is slightly lower than the case of the positioning signal within a predetermined range and the similarity on the code phase axis is lower than the criterion similarity for determining as the multipath signal, the unnecessary signal may be identified as the cross correlation signal.

Such the interfering wave signal, the multipath signal, and the cross correlation signal is identified as indicated as follows. First, a threshold on a first frequency axis, and a threshold on a second frequency axis lower than the threshold on the first frequency axis are set for the similarity on the frequency axis. Here, through calculating the similarity in the case of the multipath signal and the similarity in the case of the cross correlation signal in advance, the threshold on the first frequency axis is set to a predetermined value between these similarities. Further, through calculating the similarity in the case of the cross correlation signal and the similarity in the case of the interfering wave signal in advance, the threshold on the second frequency axis is set to a predetermined value between these similarities.

Next, a threshold on a first code phase axis, a threshold on a second code phase axis lower than the threshold on the first code phase axis, and a threshold on a third code phase axis lower than the threshold on the second code phase axis are set for the similarity on the code phase axis. Here, through calculating the similarity in the case of the multipath signal in advance and calculating the similarity in the case of determining as the positioning signal, the threshold on the first code phase axis is set to a predetermined value between these similarities.

Further, through calculating the similarity in the case of the multipath signal and calculating the similarity in the case of the cross correlation signal in advance, the threshold on the second code phase axis is set to a predetermined value between these similarities. Furthermore, through calculating the similarity in the case of the cross correlation signal and calculating the similarity in the case of the interfering wave signal in advance, the threshold on the third code phase axis is set to a predetermined value between these similarities.

Further, the similarities on the frequency axis and the similarity on the code phase axis are compared with each corresponding threshold, and based on high-low relations with respect to each threshold, the unnecessary signal is determined as any one of the multipath signal, the cross correlation signal, and the interfering wave signal.

Next, after identifying the insignificant reception signal, the unnecessary signal, and the significant positioning signal and further identifying the kind of the unnecessary signal, the identifier 35 outputs the determination result to the demodulating unit 13 similarly to the first embodiment (S207). The demodulating unit 13 executes the acquiring and tracking processing of the reception signal according to the determination result.

Figure 7:
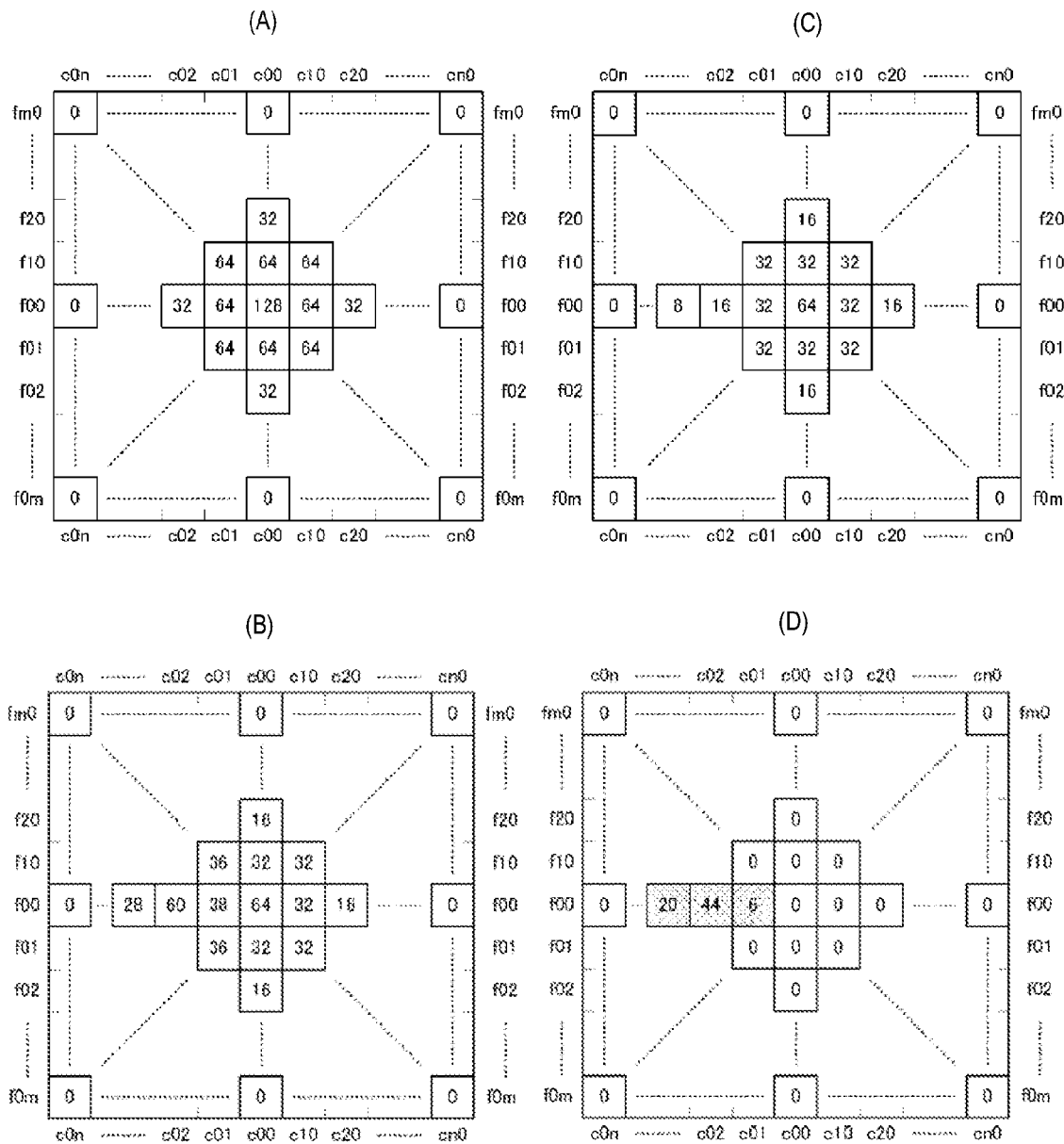
FIGS. 7(A) to 7(D) are views illustrating an example of processing according to the second embodiment.

Next, through using FIG. 7, the specific identifying method of the unnecessary signal by the similarity is explained. FIG. 7(A) is a view showing a state where the reference property described above is stored as the two-dimensional correlation data on the two orthogonal axes, the code phase axis and the frequency axis, and FIG. 7(B) is a view showing the two-dimensional correlation data of the actual measurement property of the reception signal including the multipath signal described above. Further, FIG. 7(C) is a view showing the two-dimensional correlation data of the corrected reference property, and FIG. 7(D) is a view showing two-dimensional data of a result of difference between the actual measurement property and the corrected reference property.

Such two-dimensional data is constituted, on one axis as the frequency axis having a frequency of the target signal indicated as "f00", by sampling at every predetermined frequencies on low and high frequency sides, and, on the other axis as the code phase axis having a code timing indicated as "c00" at which an ideal correlation peak is obtained when the replica code is correlation processed with respect to the target signal, by sampling at every predetermined code phase difference on sides where the code phase advances and retards.

The identifier 35 acquires the actual measurement property in a form of the two-dimensional correlation data as shown in FIG. 7(B) centering on the frequency f00 and the code phase c00 as described above, and the identifier 35 further corrects levels of the entire two-dimensional correlation data of the reference property so that a correlation value of the frequency f00 and the code phase c00 in the two-dimensional correlation data of the reference measurement property coincides with a correlation value of the frequency f00 and the code phase c00 in the two-dimensional correlation data of the actual measurement property. In this manner, the identifier 35 acquires the two-dimensional correlation data of the corrected reference property as shown in FIG. 7(C).

Next, the identifier 35 calculates a difference between the levels of the two-dimensional correlation data of the actual measurement property in FIG. 7(B) and the two-dimensional correlation data of the corrected reference property in FIG. 7(C) for every element data at corresponding frequency and code phase, respectively, and derives the two-dimensional correlation data of the difference values as shown in FIG. 7(D).

Next, the identifier 35 identifies the reception signal corresponding to the actual measurement property whether it is the target signal or the unnecessary signal. Specifically, if the reception signal is the target signal, ideally, the levels of the difference values through the entire element data of the two-dimensional data become "0." There fore, the identifier 35 acquires a sum value or an average value of the levels of the difference values through the element data of the two-dimensional data, and if the sum value or the average value is below a predetermined threshold close to "0", the identifier 35 determines as the target signal, and if it is above the predetermined threshold, the identifier 35 determines as the unnecessary signal. Here, the identifier 35 may calculate the variance or the standard variation to include them into the determination criteria.

Further, the identifier 35 identifies the kind of the unnecessary signal by calculating the sum value or average value of the difference values for every frequency (e.g., "f01" or "f20" in FIG. 7) and every code phase (e.g., "c10" or "c02" in FIG. 7). For example, in the case of the multipath signal, as shown in FIGS. 6(B) and 7(B), the property of the multipath signal is different on the code phase axis, and a range where the difference values exist on the code phase retarding side exists. Therefore, by calculating the average value or the sum value of the difference values for every code phase, data above the threshold appears on the code phase retarding side. Through detecting the data, the identifier 35 identifies the unnecessary signal as the multipath signal.

As above, by comparing with the reference property set in advance, the unnecessary signal can also be identified. Further, by using the method of this embodiment, the unnecessary signal can be identified by using the similarity regardless of the change of the reception level. Note that, in the above explanation, the similarity uses the difference value; however, for example, a divided value may be used as long as it is a calculation value from which a difference between the two correlation data can be detected.

Note that, in the above first embodiment, the identification of the cross correlation signal is performed after the identification of the multipath signal; however, the order thereof may be in the opposite order.

Further, in the above explanation, the method of frequency transforming the result of correlation processing between the replica code and the reception signal is shown. However, even by dividing the reception signal into a plurality of frequency band elements and then correlation processing each frequency element with the replica code, the correlation data on the two axes, the code axis and the frequency axis, as described above, can be acquired.

Further, in the above explanation, the unnecessary signal identifying device provided to the demodulating unit of the GNSS receiving apparatus is explained; however, an unnecessary signal identifying device having the similar configuration can be applied to also to a demodulating unit of a wireless communication receiving apparatus using a spectrum spread system.

DESCRIPTION OF NUMERALS

100: GNSS Receiving Apparatus; 11: Positioning Signal Reception Antenna; 12: RF Processor; 13: Demodulating unit; 14: Positioning Calculator; 300: Unnecessary Signal Identifying Device; 30: Code Generator; 31: Code Delayer; 321-32$n$: Correlator; 331-33$n$: Buffer; 341-34$n$: FFT Processor; and 35: Identifier.

What is claimed is:

1. An unnecessary signal identifying device for identifying an unnecessary signal from reception signals containing a target signal that is code transformed with a predetermined spread code, the device comprising:
   a correlation data series acquirer configured to acquire a correlation data series on a code phase axis and a correlation data series on a frequency axis from correlation data between a replica code for the spread code and the reception signal; and
   an identifier configured to identify the unnecessary signal based on the correlation data series on the code phase axis and the correlation data series on the frequency axis and to determine a kind of the unnecessary signal as any one of a multipath signal, a cross correlation signal, and an interfering wave signal by considering the code phase axis and the frequency axis.

2. The device of claim 1, wherein the correlation data series acquirer is further configured to store the correlation data for a predetermined time period and transform the stored correlation data to data for a frequency range so as to acquire the correlation data series on the code phase axis and the correlation data series on the frequency axis.

3. The device of claim 1, wherein
   the identifier is further configured to store in advance a correlation data series on the code phase axis and a correlation data series on the frequency axis which are formed with correlation data of which the target signal is correlation processed with the replica code, as a reference property, and
   the identifier is further configured to identify the unnecessary signal by comparing the reference property with an actual property based on the correlation data series on the code phase axis and the correlation data series on the frequency axis which are formed with the correlation data of which the reception signal is correlation processed with the replica code.

4. The device of claim 3, wherein
   the identifier is further configured to identify the unnecessary signal by correcting the correlation data of the reference property or the actual property so as to coincide peak levels of the correlation data between the reference property and the actual property, and calculating similarities therebetween on the code phase axis and the frequency axis by using the corrected property.

5. The device of claim 4, wherein
   the identifier is further configured to determine the kind of the unnecessary signal as any one of the multipath signal, the cross correlation signal, and the interfering wave signal, by using both the similarity on the frequency axis and the similarity on the code phase axis.

6. The device of claim 4, wherein
   the identifier is further configured to calculate a differential value between the properties after the correction, as the similarity.

7. The device of claim 1, wherein
   the identifier is further configured to identify the unnecessary signal as any one of the interfering wave signal, the multipath signal, and the cross correlation signal based on the number of the correlation data at peak levels on the code phase axis, the number of the correlation data at peak levels on the frequency axis, and a positional relation between the peaks.

8. A GNSS receiving apparatus for using positioning signals transmitted from GNSS satellites as the target signals and receiving the positioning signals, comprising:
   a demodulator including the unnecessary signal identifying device of claim 1 and configured to track the target signals identified by the unnecessary signal identifying device and demodulate the target signals.

9. The GNSS receiving apparatus of claim 8, wherein the demodulator is further configured to continue the identifying processing of the target signals and the unnecessary signal until the target signals are acquired and tracked.

10. A mobile terminal for executing an application using a position of the apparatus itself, comprising:
   the GNSS receiving apparatus of claim 8; and
   a positioning calculator configured to calculate the position of the apparatus itself by using the target signals acquired by the GNSS receiving apparatus.

11. A method of identifying an unnecessary signal from reception signals containing a target signal that is code transformed with a predetermined spread code, the method comprising:

acquiring a correlation data series on a code phase axis and a correlation data series on a frequency axis from correlation data between a replica code for the spread code and the reception signal;

identifying the unnecessary signal based on the correlation data series on the code phase axis and the correlation data series on the frequency axis; and determining a kind of the unnecessary signal as any one of a multipath signal, a cross correlation signal, and an interfering wave signal by considering the code phase axis and the frequency axis.

12. The method of claim 11, wherein the acquiring the correlation data series includes storing the correlation data for a predetermined time period and transforming the stored correlation data to data for a frequency range so as to acquire the correlation data series on the code phase axis and the correlation data series on the frequency axis.

13. The method of claim 11, wherein the identifying the unnecessary signal includes storing in advance a correlation data series on the code phase axis and a correlation data series on the frequency axis which are formed with correlation data of which the target signal is correlation processed with the replica code, as a reference property, and wherein the identifying the unnecessary signal includes identifying the unnecessary signal by comparing the reference property with an actual property based on the correlation data series on the code phase axis and the correlation data series on the frequency axis which are formed with the correlation data of which the reception signal is correlation processed with the replica code.

14. The method of claim 13, wherein the identifying the unnecessary signal includes identifying the unnecessary signal by correcting the correlation data of the reference property or the actual property so as to coincide peak levels of the correlation data between the reference property and the actual property, and by calculating similarities therebetween on the code phase axis and the frequency axis by using the corrected property.

15. The method of claim 14, wherein the determining includes determining the kind of the unnecessary signal as any one of the multipath signal, the cross correlation signal, and the interfering wave signal, by using both the similarity on the frequency axis and the similarity on the code phase axis.

16. The method of claim 14, wherein the identifying the unnecessary signal includes calculating a difference value between the properties after the correction, as the similarity.

17. The method of claim 11, wherein the determining the kind of the unnecessary signal includes identifying the unnecessary signal as any one of the interfering wave signal, the multipath signal, and the cross correlation signal based on the number of the correlation data at peak levels on the code phase axis, the number of the correlation data at peak levels on the frequency axis, and a positional relation between the peaks.

\* \* \* \* \*